United States Patent [19]

Bennett

[11] Patent Number: 4,939,112

[45] Date of Patent: Jul. 3, 1990

[54] CATALYST FOR SYNTHESIS OF VESICULAR PHENOXY RESINS

[75] Inventor: Everett W. Bennett, Easthampton, Mass.

[73] Assignee: James River Paper Company, Inc., South Hadley, Mass.

[21] Appl. No.: 254,048

[22] Filed: Oct. 6, 1988

[51] Int. Cl.$^5$ .............................................. B01J 31/02
[52] U.S. Cl. ...................................... 502/164; 528/219
[58] Field of Search .......................................... 502/164

[56] References Cited

U.S. PATENT DOCUMENTS

| | | | |
|---|---|---|---|
| 4,341,658 | 7/1982 | Monnerat et al. | 502/164 X |
| 4,692,504 | 9/1987 | Frank | 502/164 X |
| 4,734,535 | 3/1988 | Greif | 502/164 X |

*Primary Examiner*—Patrick P. Garvin
*Attorney, Agent, or Firm*—Burns, Doane, Swecker & Mathis

[57] ABSTRACT

A catalyst for synthesis of vesicular phenoxy resins is disclosed. The catalyst includes a water-insoluble complex of a hydric phenol and a quaternary ammonium or phosphonium salt of the hydric phenol. Preferably, the hydric phenol is an intermediate of the phenoxy resin being produced. Dihydric phenols, such as sulfonyldiphenol are preferred. The invention further relates to a reaction medium for polymerization of phenoxy resins including the above-described catalyst and a solvent medium capable of dissolving the phenoxy resins and otherwise not interfering with the polymerization reaction. The solvent medium is advantageously free of toxic Methyl Cellosolve.

10 Claims, No Drawings

CATALYST FOR SYNTHESIS OF VESICULAR PHENOXY RESINS

BACKGROUND OF THE INVENTION

The present invention relates to catalysts for synthesizing polymers and, more particularly, to catalysts for synthesizing phenoxy resins suitable for use in vesicular films. Phenoxy resins, and especially highly long-chain branched phenoxy resins, are known to be well adapted as matrices for enhanced film speed vesicular films. Thus, there is described in U.S. Pat. No. 4,451,550 a highly long-chain branched non-linear phenoxy resin advantageously comprising the copolymerization product of:

(i) at least one dihydric phenol, e.g., sulfonyldiphenol;
(ii) an epoxy comonomer having two epoxy functional groups, e.g., resorcinol diglycidyl ether;
(iii) a branching agent comprising an epoxy or phenolic compound having a functionality greater than 2, and preferably at least 3, wherein the amount of branching agent is sufficient to provide at least 10 mole percent branch sites in the polymer resin, and, most preferably;
(iv) a monofunctional phenol or epoxide as an endblocker compound.

The polymerization is typically carried out under alkaline catalysis using catalysts such as tetra-alkyl ammonium bases which are highly ionic and dissociated in organic solvents. Specific catalysts which can be employed include tetramethyl and tetrabutyl ammonium hydroxides and glycidyl trimethyl ammonium chloride used in conjunction with an alkali metal hydroxide e.g., potassium hydroxide, from which the precipitated potassium chloride has been filtered.

The preferred solvent for carrying out the polymerization reaction has been Methyl Cellosolve since it is capable of dissolving the polymeric product even at solids levels as low as 10% by wt. and does not otherwise interfere with the polymerization chemistry. However, Methyl Cellosolve is now recognized to be highly toxic. Additionally, due to the formation of a layer of "skin" on the surface of the barrier type polymer as the solvent is being removed, it is virtually impossible to completely remove the toxic Methyl Cellosolve from the polymeric product.

In light of the above, alternative solvent systems have been sought which, like Methyl Cellosolve, are capable of dissolving the polymeric product while not interfering with the polymerization chemistry but, unlike Methyl Cellosolve, are not toxic. To this end, the inventor has found that certain nontoxic solvents including, but not limited to 1,3-dioxolane (having a boiling point of 74°-75° C.) as well as alcohols such as Dowanol-PM and tetrahydrofurfuryl alcohol (having a boiling point of 178° C.) are suitable for the synthesis of highly long chain branched phenoxy resins for use in vesicular films. Also suitable is 1,4 dioxane, although such is more toxic than 1,3-dioxolane.

Because high molecular weight phenoxy resins are not totally soluble in the less costly Dowanol solvent at less than circa 40% solids, it is necessary to use a solvent mixture including the better, but more costly, low boiling dioxolane solvent. Since solvent mixtures including circa 30–40% by wt. dioxane (having a boiling point of 76°-77° C.) reflux at lower temperatures than Methyl Cellosolve, the polymerization reaction in these alternative solvents obviously occurs at lower temperatures compared to the Methyl Cellosolve system. The resulting lower temperatures require the employment of much higher concentrations of catalyst, even on the order of an eightfold increase, in order to economically complete the polymerization reaction. It has been found, however, that the incorporation of the higher concentrations of catalyst in the reaction mixture results in the formation of optical defects in the phenoxy resin when used to make a diazo vesicular microfilm. An investigation of this phenomenon demonstrated that those defects were caused by the crystallization of alkali metal halide salts, e.g., sodium or potassium chlorides and bromides, which were adventitiously added to the reaction mixture via the polymerization catalyst made in Dowanol-PM instead of Methyl Cellosolve. More specifically, the above-described quaternary ammonium salts used to catalyze the polymerization reaction, e.g., a quaternary ammonium hydroxide, are typically prepared as follows:

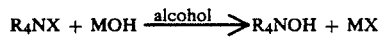

$$R_4NX + MOH \xrightarrow{alcohol} R_4NOH + MX$$

wherein M is a sodium ion or a potassium ion, X is chloride or bromide, and R is alkyl or alkenyl groups.

The metal halide salt by-product is virtually insoluble in the alcoholic solvent and is thus typically separated from the desired quaternary ammonium salt catalyst by filtration. Nonetheless, residual levels of the by-product metal halide salts remain in the catalytic solution The presence of residual levels of metal halide salts in the catalytic solution was not significant when the polymerization was carried out in a Methyl Cellosolve solvent since only relatively low concentrations of catalyst were required to economically run the reaction at the high temperatures possible in Methyl Cellosolve. However, because of the highly increased concentrations of catalyst required when the lower boiling alternative solvents described above are employed, the appearance of optical defects in the diazo vesicular films formed from the phenoxy resin, attributable to crystallization of alkali metal halide salts, was observed.

To alleviate such problems, water-washing of the phenoxy resin to free it of the alkali metal halide salt contaminant was considered. However, the cost of such an operation would be prohibitively expensive. The removal of the salt contaminant from the catalytic solution via water washing was also considered but determined to be infeasible because the quaternary ammonium hydroxide catalysts are themselves water soluble and thus, would be removed along with the contaminant. Even conventional ion exchange techniques for removing metal halide salts from a solution had to be dismissed due to the low milliequivalent per gram capacity of such resins and thus, the prohibitively high amounts of exchange resin which would be required to prepare the large amounts of catalyst needed to sustain continuous polymer production.

SUMMARY AND OBJECTS OF THE INVENTION

In view of the foregoing, it should be apparent that there exists a need in the art for a catalytic system for synthesizing phenoxy resins in a Methyl Cellosolve-free solvent which can be used in concentrations high enough to run the reaction economically without otherwise deleteriously affecting the quality of the final product obtained. It is, therefore, a primary objective of the present invention to fulfill that need by providing virtually water-insoluble quaternary ammonium salt catalysts which, by virtue of such water-insolubility, enables easy removal of any alkali metal halide salt contaminants therein by water washing and in turn eliminates the possibility of defects in the polymeric product attributable to crystallization of such metal halide salts in the product.

In a first aspect, the present invention relates to a catalyst for the preparation of a phenoxy resin, the catalyst comprising a water-insoluble complex of a phenol and a quaternary ammonium or phosphonium salt of the phenol.

In a second aspect, the present invention relates to a reaction medium for preparing phenoxy resins from the monomeric constituents thereof comprising:
  (i) a catalyst comprising a water-insoluble complex of a phenol and a quaternary ammonium or phosphonium salt of the phenol;
  (ii) A solvent medium capable of dissolving the phenoxy resins and otherwise not interfering with the polymerization reaction.

In yet another aspect, the present invention relates to a process for synthesizing a phenoxy resin for vesicular films comprising copolymerizing a dihydric phenol and an epoxy comonomer having two epoxy functional groups and preferably containing end blocker and branching agent in the above described reaction medium.

With the foregoing and other objects, advantages, and features of the invention that will become hereinafter apparent, the nature of the invention may be more clearly understood by reference to the following detailed description of the invention and to the appended claims.

DETAILED DESCRIPTION OF PREFERRED EMBODIMENTS

The catalyst system of the present invention is employed for the synthesis of vesicular phenoxy resins in a solvent medium capable of dissolving the phenoxy resins and otherwise not interfering with the polymerization reaction. Preferably, for the reasons indicated above, the solvent system employed is one which is free of Methyl Cellosolve. It will be appreciated, however, that the catalyst system of the invention is applicable to any solvent system and, in addition is also operable in Methyl Cellosolve. The preparation of the resins in the absence of Methyl Cellosolve solvent is described in detail in applicant's copending application, Ser. No. 07/254,046 filed Oct. 6, 1988, the disclosure of which is hereby incorporated by reference.

The catalyst system of the present invention is advantageously a water-insoluble quaternary ammonium or phosphonium salt of a monomeric phenol compound of the phenoxy resin. Exemplary dihydric phenols suitable for synthesizing phenoxy resins including dihydroxy benzenes and compounds of the formula:

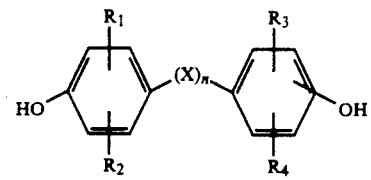

wherein $R_1$, $R_2$, $R_3$ and $R_4$ are hydrogen, halogen, or lower alkyl; n is an integer from 0–1, and when n is 1, X is —$CH_2$—; —$C(CH_3)_2$—; —$CH(CH_3)$—;

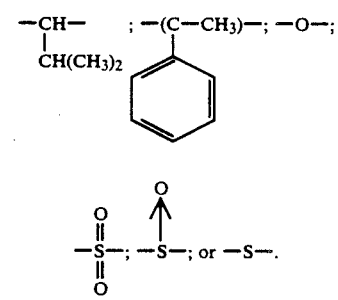

Sulfonyldiphenols (referred to as SDF), and especially 4,4'-sulfonyldiphenol are preferred dihydric phenols.

Quite unexpectedly, it has been observed that it is possible to prepare virtually water-insoluble quaternary ammonium and phosphonium salts of phenols used in the synthesis of phenoxy resins. However, unlike the ammonium hydroxide catalysts replaced by the catalysts of the invention, the water-insoluble quaternary ammonium and phosphonium salts of the invention do not give rise to formation of crystal defects in vesicular films since the water-soluble metal halide salt by-product co-produced with the water-insoluble ammonium and phosphonium salts of phenols are easily removed by water washing.

The phenols from which the ammonium or phosphonium salts are prepared are preferably, but not necessarily, themselves intermediates of the formation of the phenoxy resin.

The preferred water-insoluble quaternary ammonium or phosphonium salt of a dihydric phenol is a half-salt complex prepared from 4,4'-sulfonyldiphenol. Such salt is of the formula:

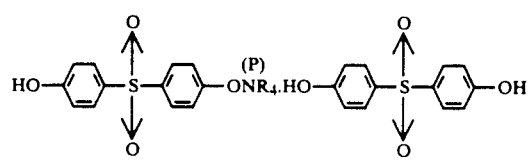

wherein R is a substitute providing insolubility in water including, but not limited to $C_1$–$C_{16}$ alkyl or aryl substituents such as ethyl, propyl, butyl, lauryl and coco as well as benzyl.

To prepare such salts, one of two reaction pathways can be followed:

SCHEME 1

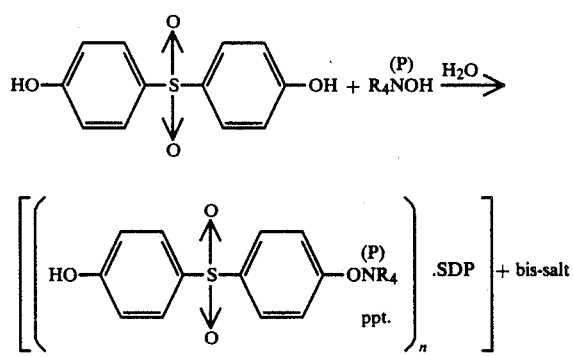

The use of a (P) in parenthesis above the "N" in the above formulae means that higher the ammonium or the corresponding phosphonium compound may be used.

Two solutions, A and B, are prepared preferably in molar strengths corresponding the composition of the desired complex salt. Solution A is prepared by dissolving the sulfonyldiphenol in hot water. Solution B is prepared by dissolving sodium hydroxide and tetrabutylammonium bromide in water. Solution B is slowly added to solution A while stirring in a vessel. After stirring for an hour while cooling to room temperature the solid product is filtered off and washed with water before air drying.

SCHEME II

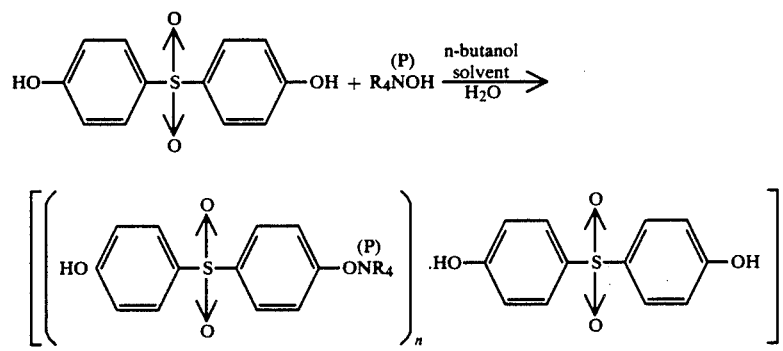

Once again two solutions, A and B, are prepared. Solution A is prepared by dissolving sodium hydroxide and the quaternary halide in water. Solution B is prepared by dissolving the sulfonyldiphenol in n-butanol. Solution A is slowly added to solution B while stirring in a vessel for about an hour. The lower water layer is separated and discarded and then the remaining butanol solution or slurry is rewashed two or three times with fresh aliquots of water. Lastly, in cases where the product is butanol soluble, if desired, remaining traces of moisture can be removed as an azeotrope thereby resulting in a clear solution of the catalyst in butanol. Otherwise, the product is filtered off.

Thus, it is the half-salt complex of the diphenol which crystallizes out and which is employed as the catalyst. The bisquaternary salt appears to be completely water-soluble even in an ice cooled solution, and is lost in the water wash unless enough phenol is present to convert the intermediate half-salt to an insoluble salt complex.

That these novel quaternary salt complexes are, indeed, new compounds and not simply mixtures of a salt and the parent phenol in the appropriate proportions is apparent from several pieces of evidence. First, the complexes can be made in a variety of media (as the examples show) and in all cases conform exactly to the 2:1 or 1:1 or 1:2 stoichiometries rather than some variable ratio as would be reasonably expected if the composition were an accidental function of the precipitation conditions. Secondly, the melting points of all of the crystalline complexes are sharp and narrow, i.e., over a 1 to 2 degree melting range rather than the broad range anticipated for a mixture of salt and parent phenol crystals. Though the majority of the complexes made to date melt lower than the parent phenol, at least one example is known that melts well above the parent phenol, e.g., the 1:1 complex of the tetra-n-butyl ammonium salt of bis-phenol A which melts at 212.5°–213.5° C. Versus 158°–159° C. for bis-phenol A itself. Lastly, the infrared spectra of the complexes either from Nujol mulls or KBr wafers show no characteristic hydroxyl absorption at all in the 3200 to 3600 cm$^{-1}$ region whereas the parent phenols all exhibit strong absorptions in that spectral region. Obviously, such behavior would not be expected from a mixture and the 3:1 ratio of "free" hydroxyls to salts groups in some of the complexes suggests an unusual hydrogen bonded structure for those complexes.

Although the above reaction schemes merely employ the generic moiety R to denote the organic substituents bonded to the nitrogen or phosphorus atom, it should be noted that the choice of substituent can influence the architecture of the phenoxy polymer produced as well as the reaction rate. It should also be noted that difficult-to-crystallize or even liquid quaternary phenol salts bearing more hydrophobic nitrogen substituents, e.g., benzyl, lauryl, etc., can be prepared in a water immiscible alcohol such as n-butanol, or water immiscible ketone such as methyl isobutylketone or isophorone and efficiently washed free of salt contamination with water without significant loss of the desired product. Thus, the catalyst employed according to the present invention can be either liquid or solid, so long as it is insoluble in water.

It is noted that there is observed a remarkable improvement in the yield of the prepared catalyst when enough diphenol is used to allow all of the half-salt formed to be complexed with one mole of additional diphenol. This is the preferred preparation and catalyst moiety since the yield of 2:1 salt: SDP complex always seems to be less.

The following examples are given by way of illustration and in no way should be construed as limiting the scope of the subject matter disclosed and claimed.

EXAMPLE 1

Preparation of the Half-Salt Complex of Sulfonyldiphenol

There were combined while stirring 268.6 g. of 10.7 wt % (Butyl)$_4$NOH (in 1:1 by wt. Dowanol-PM and dioxolane) and 25.032 g. (0.10 mole) of 4,4'sulfonyldiphenol. After an hour of stirring, the precipitate which had formed was filtered off in a Buchner funnel using Whatman #54 paper. The filter cake was rinsed with 1,3-dioxolane and air dried to yield 34.0 g. of product. The preparation was repeated and a total of 70.66 g. of product having a melting point of 199°-204° C. collected.

The precipitate was nearly pure 1:1 half quaternary salt complexed with sulfonyldiphenol. However, microscopy and energy dispersive X-ray analysis identified sodium chloride crystals as contaminants since the product had not been water washed.

EXAMPLE 2

Preparation of Half-Salt of Sulfonyldiphenol in Methyl Cellosolve 203.5 g. of 25.5% by weight (Butyl)$_4$NOH (0.20 equivalents) made in Methyl Cellosolve were reacted with 50.06 g. (0.20 mole) sulfonyldiphenol in 75 ml. of Methyl Cellosolve by combining the two solutions at room temperature while stirring. A precipitate formed immediately. Stirring was continued for one hour and the precipitate separated by filtration to yield a filter cake which was rinsed first with Methyl Cellosolve and then with a dioxolane rinse. After drying on a watch glass, 48.9 g. of a pure white precipitate of half-salt complex was recovered. The material melted at 188°-189° C. and was identified as the 2:1 complex of the half-salt and SDP. The yield was 60% of theoretical.

EXAMPLE 3

Preparation of Half-Salt Complex of Sulfonyldiohenol Using Dioxolane Dilution 50.06 g. (0.20 mole) of sulfonyldiphenol in 80 ml. of 1 1 Dowanol/dioxolane (v/v) were combined with 203.5 g. of 25.5 wt. % (Butyl)$_4$NOH solution (0.20 equivalent) diluted with 150 g. of dioxolane. Precipitation was slow but occurred over 10 minutes with stirring. After 45 minutes of additional stirring, the precipitate was filtered off and the filter cake rinsed with 1:1 (v/v) Dowanol/dioxolane. After air drying, 46 g. of product were recovered. The 188°-189° C. melting point identified the product as the 2:1 half-salt-SDP complex. The yield was 56% of theoretical.

EXAMPLE 4

Preparation of Half-Salt Complex of Sulfonyldiohenol in Water

There were combined 12.45 g. of 90% assay potassium hydroxide (0.20 equivalents) with 50.06 g. (0.20 mole) of Diphone-C, the 90,10 isomer mixture of 4,4' and 2,4'sulfonyldiphenol, in 100 ml. of water to form a solution A.

There were dissolved 55.59 g. (0.20 mole) of (Butyl)$_4$NCl (Aldrich Chemicals) in 100 ml. of hot tap water to form a solution B.

Solution B was slowly added to solution A while stirring and a precipitate immediately formed. After an additional 30 minutes of stirring, the precipitate was filtered off and washed with 300 ml. of cold water. There were recovered 66.83 g. of dry precipitate, a 90% yield, which melted at 204°-205° C. and has been identified as the 1:1 half-salt SDP complex via elemental analysis.

Because the quaternary half-salt complex is not water-soluble, it was possible to use a water wash to remove any alkali metal halide contaminants and to obtain a pure catalyst species which can be used in high concentrations without giving rise to defects in the vesicular film product attributable to salt crystal formation. The complete absence of metal halide contaminant was verified by energy dispersive X-ray analysis.

EXAMPLE 5

Preparation of Half-Salt Complex of Sulfonyldiphenol in Water Using Sodium Hydroxide A solution A was formed by dissolving 96.71 g. (0.30 mole) of (Butyl)$_4$NBr in 100 ml. of hot tap water. A solution B was formed by combining 75.09 g. (0.30 mole) of sulfonyldiphenol and 12.0 g. of 97% sodium hydroxide. The solution B was brought to 95° C. and slowly added to the solution A while stirring. The addition was carried out over a period of 30 minutes and then removed from the heat and stirred for one hour before cooling with ice water and filtering off the precipitate. The moist filter cake weighed 113.67 g. and it was reslurried in water, refiltered, and finally water washed. The second wet weight was 119.8 g. and the final air dried salt weighed 92.1 g. The product melted at 189-190 C and was thus the 2:1 half-salt complex with SDP. The yield was 75% of theoretical.

EXAMPLE 6

Preparation of Half-Salt Complex of Sulfonyldiphenol in Methyl Isobutyl Ketone Solvent and Water A solution A was formed by dissolving 96.71 g. (0.30 mole) of (Butyl)$_4$NBr along with 12.0 g. of 97% sodium hydroxide in 200 ml. of water. A solution B was formed by dissolving 75.09 g. (0.30 mole) of sulfonyldiphenol in 280 ml. of methyl isobutyl ketone. The solutions A and B were combined in a stirred separation flask and heated to 85° C. in an attempt to dissolve all solids. The water layer was removed and the methyl isobutyl ketone layer washed with 250 ml. of water. When the system had cooled to 40° C. the oil in the methyl isobutyl ketone layer crystallized completely. The product was filtered off, water washed and air dried to yield 93.5 g. of product. The melting point was 189°-190° C. which identified the material as the 2:1 complex of the half-salt and SDP. The yield was 76% of theoretical. Elemental analysis for $C_{68}H_{100}O_{12}N_2S_3$: Calc: C, 66.20; H, 8.17; N, 2.27; S, 7.79; Found: C, 66.18; H, 8.16; N, 2.18; S, 7.99.

EXAMPLE 7

Preparation of Half-Salt Complex of Sulfonyldiohenol in n-Butanol

There was prepared a solution A by combining 96.71 g. (0.30 mole) of (Butyl)$_4$NBr along with 12.0 g. of 97% sodium hydroxide in 300 ml. of water. There was also prepared a solution B by combining 75.09 g. (0.30 mole) of sulfonyldiphenol in 300 ml. of n-butanol. As the solution B was added to the solution A, a fine crystalline precipitate formed in the upper butanol layer. The lower water layer was clear and was discarded. The butanol slurry was washed three times with 300 ml. aliquots of water, filtered and water washed in a filter before air drying. The moist filter cake weighed 118.5 g. and the final air dried product weighed 89.8 g. The melting point was 189° C. which identified the material as the 2:1 complex of the half-salt and SDP. The yield was 73% of theoretical.

EXAMPLE 8

Preparation of Half-Salt Complex of Sulfonyldiohenol in Butanol/Water

There was first prepared a solution A by combining 127.2 g. Variquat 80MC (Sherex Co.) solution (0.30 mole), 12.37 g. of 97% sodium hydroxide and 300 ml. of water. Variquat-80MC is an 80 wt. % solution of dimethyl benzyl alkyl ammonium chloride with 12% isopropanol and 8% inert ingredients. Alkyl is: 50% $C_{14}$, 40% $C_{12}$, 10% $C_{16}$. A solution B was also prepared by combining 75.09 g. (0.30 mole) of sulfonyldiphenol and 300 g. of hot butanol. The solution B was slowly added to the solution A and a product, which was soluble in the upper butanol layer was formed. After 15 minutes of rapid stirring the butanol layer could be separated quickly and cleanly from the water layer, which was discarded. The butanol layer was washed three times with 300 ml. aliquots of water and weighed 474.1 g. wet. The solution was placed in a rotary evaporator at 40° C. to remove residual amounts of water as an azeotrope. The remaining solution weighed 458.3 g. which is a 98.4% recovery and hence indicates quantitative formation of the half-salt.

EXAMPLE 9

Preparation of Phosphonium Half-Salt Complex Sulfonyldiohenol

There were dissolved 166.9 g. of sulfonyldiphenol in 400 ml. of n-butanol by heating. While stirring this solution rapidly, a second solution of 13.74 g. of 97% pure sodium hydroxide and 115.42 g. of 98% pure (Butyl)$_4$PBr in 400 ml. of water was added dropwise thereto. After the addition was complete, which required about thirty minutes, the suspension was stirred for one hour before draining the water phase. Next, the butanol layer and its suspended product were water washed twice with 250 ml. aliquots of cold water. The solid was then filtered from the butanol, rinsed with 400 ml. of cold water and finally rinsed with 200 ml. of hexane. The crystals were spread on filter paper and dried in the air for two days.

The yield was 246.23 g. of white crystals which is 97.3% of the theoretical yield of 253.02 g. of 1:1 half-salt complex. The crystals melted at 192°–193° C. Elemental analysis for $C_{40}H_{55}O_8PS_2$: Calc: C, 63.29; H, 7.30; P, 4.08; S, 8.45; Found: C, 63.47; H, 7.69; P, 4.09; S, 8.65.

EXAMPLE 10

Preparation of Benzyl(trimethyl) Ammonium Half-Salt Complex of Sulfonyldiphenol There was prepared a solution of 166.9 g. of sulfonyldiphenol in 400 ml. of n-butanol by warming and stirring. To that solution, there was added dropwise a solution of 13.74 g. of 97% pure sodium hydroxide and 63.81 g. of 97% pure benzyltrimethyl ammonium chloride in 300 ml. of water. The addition was carried out over a period of thirty minutes and no precipitate formed. After an additional thirty minutes of stirring, the water layer was cleanly and rapidly removed. The butanol solution was then washed twice with 250 ml aliquots of cold water to form two separate splits, the first of which was also fast and clean and the second of which was slower and with a hazy aqueous phase.

Since no precipitate had formed, the butanol layer was diluted 1:1 with hexane and a clear top layer separated above a smaller dark colored viscous layer that weighed 261.55 g. The viscous lower layer did not crystallize even with ice cooling. Solvents were removed at full aspirator vacuum and 72° C. in a rotary evaporator until foaming halted the strip and 227.81 g. of a clear burgundy colored fluid including the product was recovered.

EXAMPLE 11

Preparation of Variquat 80MC Half-Salt Complex of Sulfonyldiphenol

There was first prepared a solution A by combining 141.36 g. Variquat 80MC, 13.74 g. of 97% sodium hydroxide and 300 ml. of water. There was also prepared a solution B by combining 166.8 g. sulfonyldiphenol and 400 ml. of warm n-butanol.

The solution A was added dropwise to the stirred solution B over a period of 30 minutes. No precipitate formed. The water layer was cleanly and rapidly drained off. This was followed by two 200 ml. cold water washes. The addition of 300 ml. of hexane did not cause formation of a precipitate.

The solvent was then removed in a rotary evaporator and stripped at full aspirator vacuum and 72° C. until frothing prevented further treatment. The remaining material was a very thick clear burgundy colored liquid including the quaternary salt complex. The recovery of 294.7 g. versus a theoretical yield of 267.8 g. indicates quantitative conversion to the desired half-salt complex.

EXAMPLE 12

Preparation of Ammonium Half-Salt Complex of Resorcinol

There were dissolved 20.48 g. (0.1860 mole) of resorcinol in 100 ml. of water. Added to the solution, dropwise over 30 minutes with magnetic stirring, was a second solution made from 30.0 g. of (Butyl)$_4$NBr (0.0930 equivalents) and 3.84 g. of 97% sodium hydroxide in 100 ml. of water. A thick gum-like precipitate formed which only partially dissolved upon heating to 80° C. and which failed to crystallize upon cooling to room temperature. The preparation was ice cooled and the supernatent liquid decanted. The precipitate was then rinsed with water and air dried. There was recovered 40.08 g. of a brown gummy fluid, or 93.3% of the theoretical yield for the 1:1 complex.

EXAMPLE 13

Preparation of Ammonium Half-Salt Complex of p-t-Butyl Phenol

There was charged into a reactor 27.94 g. (0.186 mole) of p-t-butyl phenol partially dissolved in 100 ml. of water and maintained at room temperature while stirring magnetically. A second solution was prepared from 30.0 grams of (Butyl)$_4$NBr and 3.84 g. of 97% sodium hydroxide (0.093 equivalent quaternary) and added dropwise to the previously prepared solution. A fine white precipitate was formed. The addition was carried out over a period of 15 minutes and was followed by an additional hour of stirring at room temperature.

The air dried precipitate weighed 40.65 g, which corresponds to 94.7% of the 50.39 g. theoretical yield of the 1:2 salt complex. The product had a melting point of 116.5°–118° C.

EXAMPLE 14

Preparation of Ammonium Half-Salt Complex of p-t-Butyl Phenol and Demonstration of the Superior Insolubility of the Complexed Salt There was first prepared a solution A by combining 27.94 g (0.186 mole) of p-t-butyl phenol in 50 ml. of isopropyl alcohol. There was also prepared a solution B by combining 59.96 g. of (Butyl)$_4$NBr (0.1860 mole), 7.67 g. (0.1860 eq.) of 97% sodium hydroxide and 250 ml. of water. The solution A was added dropwise to solution B at room temperature under magnetic stirring over a period of one hour such that there was always an excess of base present. A translucent suspension resulted. Upon filtration, there was recovered 21.78 g. of a moist filter cake which translates to a maximum yield of 29.9% of the 72.85 g. theoretical yield of salt. The salt is obviously quite water soluble.

The filter cake and the filtrate were recombined quantitatively and a second aliquot of 27.94 g. of p-t-butyl phenol and 50 ml. of isopropyl alcohol were added dropwise with stirring. The precipitate was then filtered off and washed with 100 ml. of cold water to yield 90.3 g. of wet precipitate. The filtrate was diluted with 250 ml. of water and more precipitate formed. This was filtered off and air dried separately. Further water dilution of the filtrate had no effect. Crystal crop I melted at 117°–118° C. and crop II melted at 116°–117° C. The combined yield of the 1:2 complex was 79.20 g. which is 92.2% of the 85.82 g. theoretical yield. This clearly demonstrates the enhanced insolubility of the complexed salt. Elemental analysis for C$_{46}$H$_{77}$O$_3$N: Calc: C, 79.83; H, 11.21; N, 2.02; Found: C, 79.61; H, 11.42; N, 1.96.

EXAMPLE 15

Preparation of Phosphonium Half-Salt Complex of p-t-Butyl Phenol

There was first prepared a solution A by combining 60.08 g. (0.40 mole) p-t-butyl phenol and 50 ml. of isopropyl alcohol which was diluted with 50 ml. of water. A solution B was also prepared by combining 69.24 g. of (Butyl)$_4$PBr, (0.20 eq.) 8.24 g. (0.20 eq.) of 97% sodium hydroxide and 150 ml. of water. The solution B had two layers. Fifteen minutes after adding solution B to solution A, a white precipitate appeared. After another hour had passed, the solution was heated in order to attempt crystallization. After heating to 75° C. for half an hour, an oil emulsion was obtained. This was then cooled. After an hour, crystals began to form. After another hour elapsed, the reaction vessel, now filled with precipitate, was cooled in ice water, filtered and water washed. The filtrate was then diluted to 700 ml. volume with water and the precipitate that formed filtered off and washed with 100 ml. of ice water. No more precipitate was observed to form in this filtrate. After air drying for three days, the two precipitates weighed 76.93 g. and 13.04 g. respectively and had melting points of 90°–91° C. and 89°–90° C., respectively. This represents 95.2% of the theoretical 94.52 g. yield of the 1:2 salt complex. Elemental analysis for C$_{46}$H$_{77}$O$_3$P: Calc: C, 77.92; H, 10.95; P, 4.37; Found: C, 77.94; H, 10.75; P, 4.20.

EXAMPLE 16

Preparation of Ammonium Half-Salt Complex of Bis Phenol-A

There was first prepared a solution A by combining 45.66 g. (0.20 mole) of bis phenol-A dissolved in 50 ml. of acetone at room temperature to yield a clear solution. This solution was brought just to the cloud point with 20 ml. of water. There was also prepared a solution B by combining 32.24 g. (0.10 eq.) of (Butyl)$_4$NBr, 4.12 g. (0.10 eq.) of 97% sodium hydroxide and 125 ml. of water. The solution B was slowly added dropwise to solution A at room temperature while stirring. After a few minutes, a white precipitate formed. After another 40 minutes, when all the solution B had been added, the reaction vessel was filled with a white precipitate. There were then added 200 ml. of cooled water to yield a total water volume of 325 ml. The mixture was stirred at room temperature for nearly two hours and then filtered and the filter cake washed with 200 ml. of cooled water. No additional precipitate was found in the clear and colorless filtrate. The crystalline product was allowed to air dry.

There were recovered 69.29 g. of a white free flowing powder which is 99.27% of the theoretical yield of 69.80 g. The material balance indicates that the product is the 1:1 half-salt complex. The melting point was found to be 212.5°–213.5° C. Elemental analysis for C$_{46}$H$_{67}$O$_4$N: Calc: C, 79.15; H, 9.67; N, 2.00; Found: C, 79.05; H, 9.71; N, 1.94.

EXAMPLE 17

Demonstration of the Conversion of a Liquid Phenol Salt to a Solid Complex

A solution A was prepared from 19.74 g. (0.100 mole) of 2,4,5-trichlorophenol and 50 ml. of isopropyl alcohol. A solution B was also made from 32.24 g. (0.100 equiv.) of (Butyl)$_4$NBr, 4.12 g. (0.10 equiv.) of 97% pure sodium hydroxide and 250 ml. of water. Next, solution A was added dropwise to solution B which was stirred. Within eighteen minutes the initially clear solution began clouding and when all of solution A had been added (a total of 43 minutes) there was a brownish liquid layer on the bottom of the flask. In order to convert the liquid to a solid complex a second dropwise addition of 19.74 g. (0.100 mole) of 2,4,5-trichlorophenol in 50 ml. of isopropyl alcohol was made over ten minutes and then 100 ml. of water was added to the cloudy suspension with no change. Further water dilution to a total volume of 900 ml. followed by 15 minutes of stirring resulted in solidification. The suspension was stirred overnight, filtered, and the filter cake washed with 50 ml. of water. (Water dilution of the filtrate caused no further precipitation.)

The air dried crystalline product weighed 26.24 g. (which is a 41.2% yield of the 1:1 salt complex) and melted at 83°–84° C. Elemental analysis for C$_{28}$H$_{41}$Cl$_6$O$_2$N: Calc: C, 52.85; H, 6.49; Cl, 33.43; N, 2.20; Found: C, 52.87; H, 6.64; Cl, 33.51; N, 2.31.

EXAMPLE 18

A Test of the Water Solubility of the Half-Salt of Sulfonyl Diphenol via Addition of SDP to a Basic Solution in Equivalent Amounts A solution A was prepared by dissolving 32.24 g. (0.10 equiv.) of (Butyl)$_4$NBr and 4.12 g. (0.10 equiv.) of 97% sodium hydroxide and 100 ml. of water. Solution B was made from 25.03 g. (0.100 mole) of sulfonyl diphenol in 50 ml. of acetone. Next, solution B was added dropwise at room temperature to magnetically stirred solution A over 65 minutes. The precipitate that had formed was filtered off without washing and air dried. Addition of 100 ml. of water to the filtrate caused no further precipitation.

The theoretical yield of tetrabutyl ammonium half-salt of SDP is 0.10 mole or 49.17 g. but the product isolated (27.59 g.) melted at 187°–190° C. which is the melting point of the 2:1 half-salt complex. This represents a 67.1% yield of the possible conversion to that complex at the stoichiometry used in the experiment and clearly demonstrates the preferential formation of the less soluble complexes even under conditions conducive to exclusive half-salt formation.

EXAMPLE 19

Preparation of the Tetrabutyl Ammonium Half-Salt Complex of 4,4'-Sulfonyl Diphenol A solution A was made by dissolving 84.02 g. (0.33 mole) of 4,4'-sulfonyl diphenol in 300 g. of isophorone by warming. Solution B, made from 54.07 g. (0.167 equiv.) of (Butyl)$_4$NBr and 6.92 g. (0.167 equiv.) of 97% sodium hydroxide in 250 ml. of water, was added dropwise to solution A over 45 minutes while stirring. The precipitate was at first oily in appearance but became a suspension of fine crystals. The phase separation and water washing were slower than with butanol, probably due to the 0.92 density of isophorone. After two 250 ml. water washes of the organic layer the product was filtered off, air dried, and found to weigh 109.15 g., which is an 88.6% yield. The melting point was 204.5°–205.5° C. for the colorless needle-like crystals and elemental analysis established the structure as the 1:1 half-salt complex. Elemental analysis for C$_{40}$H$_{55}$O$_8$NS$_2$: Calc: C, 64.75; H, 7.47; N, 1.89; S, 8.64; Found: C, 64.78; H, 7.57; N, 1.83; S, 8.90.

EXAMPLE 20

Preparation of the Tetrabutylammonium Half-Salt Complex of Diphone-C Using the 1:2 Mole Base to Phenol Stoichiometry to Improve Conversion A solution A was made from 115.55 g. (0.462 mole) Diphone-c, the 90:10 isomer mix of 4,4' and 2,4'-sulfonyl diphenol, in 385 ml. of warm n-butanol and this was stirred during dropwise addition of solution B which consisted of 74.36 g. (0.231 equiv.) of (Butyl)$_4$NBr and 9.51 g. (0.231 equiv.) of 97% sodium hydroxide in 300 ml. of water. The clear butanol layer generated a precipitate after 10 minutes and at the end of the addition (1.5 hours) the slurry was stirred for an additional 15 minutes before discarding the lower water layer and washing the butanol slurry of crystals with 250 ml. of cold water. The crystalline product was filtered from the butanol and water washed with 350 ml. of cold water before air drying. The dry product weighed 170.61 g. which is 99.5% the theoretical yield of the 1:1 half-salt complex. This "technical grade" of the complex melted at 204°–205° C. sharply as opposed to the 204.5°–205.5° C. melting point for complex derived from pure 4,4'-sulfonyl diphenol. Energy dispersive x-ray analysis verified the complete absence of sodium bromide from the product. Elemental analysis for C$_{40}$H$_{55}$O$_8$NS$_2$: Calc: C, 64.75; H, 7.47; N, 1.89; S, 8.64; Found: C, 64.76; H, 7.36; N, 1.93; S, 8.91.

EXAMPLE 21

Preparation of a Phenoxy Resin in Methyl Cellosolve Free Solvent System Using the Half-Salt 2:1 Complex with Sulfonyldiphenol The sulfonyldiphenol half-salt prepared in water in Example 5 was used as a catalyst to prepare a phenoxy resin. There were charged into a reactor 434.8 g of WC-69 diglycidyl ether of resorcinol (available from Wilmington Chemical Co.) as epoxy comonomer having two epoxy functional groups; 83.15 g. of triglycidyl p-aminophenol (Ciba-Geigy 0510) as branching agent; 238.32 g. of 4,4'-sulfonyldiphenol as the dihydric phenol, (the amount being based on 264.6 g. stoichiometric minus 26.28 g. catalyst correction); 109.1 g. of resorcinol, 24.04 g. of p-tertiary butyl phenol as end blocker and 0.042 mole (51.64 g.) of the half-salt catalyst prepared in Example 5 which is 0.084 equivalents of quaternary.

The reaction was carried out in two stages. Stage I was run at a 30% solids level in a solvent of 1588.4 g. Dowanol-PM and 510.6 of 1,3-dioxolane. Stage 2 was carried out at a 25% solids level by adding 510.6 g. additional dioxolane. The results were as follows:

| Time (min) | Temperature (°C.) | Results |
| --- | --- | --- |
| Stage I | | |
| 0 | | Start heating with catalyst in solution |
| 15 | 90 | |
| 20 | 103 | catalyst in solution |
| 25 | 104 | solution clear |
| 250 | 103 | solution clear |
| 330 | 102 | solution clear but viscosity rising |
| 370 | 102 | slight haze, solution somewhat viscous |
| 450 | 102 | slight haze, solution somewhat viscous |
| Stage II | | |
| 530 | 93.5 | very slight haze |
| 560 | quenched | |

The quenching agent employed was 12.10 g. of 85% H$_3$PO$_4$ in 138.7 g. of tetrahydrofurfuryl-alcohol.

The resulting product had a Brookfield viscosity of 1237 cp at room temperature measured with a number 2 spindle.

The above example demonstrates that the half-salt complex catalysts of the present invention can be used to synthesize phenoxy resins.

EXAMPLE 22

Preparation of Phenoxy Resin in Methyl Cellosolve-Free Solvent Using Half-Salt Catalyst Prepared in Butanol/Water The half-salt of sulfonyldiphenol prepared in butanol/water according to Example 8 was employed as catalyst.

There were combined in a reactor 412.7 g. of WC-69; 110.9 g. of C-G/0500; 235.28 g. of sulfonyldiphenol (261.56 g. stoichiometric minus 26.28 g. adjustment for the sulfonyldiphenol in the catalyst); 115.06 g. resorcinol; 24.04 g. of p-tertiary butyl phenol; and 0.105 equivalents (160.4 g. solution) of the half-salt sulfonyldiphenol catalyst prepared in Example 8.

As in Example 17, the polymerization was carried out in two stages, namely Stage I at a 30% solids level in 1561.6 g. Dowanol-PM and 493 g. dioxolane and Stage II at a 25% solids level by adding 477.5 g. dioxolane. The results are as follows:

| Time (min) | Temperature (°C.) | Results |
|---|---|---|
| | Stage I | |
| 0 | 23 | solution clear |
| 10 | 55 | solution clear |
| 25 | 101 | solution clear |
| 30 | 103 | solution clear |
| 175 | 102 | slight viscosity increase |
| 205 | 102 | still clear |
| 280 | 102 | some hazing |

| Time (min) | Temperature (°C.) | Results |
|---|---|---|
| | Stage II | |
| 295 | 94 | light, amber color and clear |
| 335 | quench | |
| 347 | 60 | |

The quenching agent employed was the same one employed in Example 21.

The resulting product had a Brookfield viscosity of 963 cp at room temperature measured with a number 2 spindle at 12 rpm. The coating prepared from such resin was free from salt crystal defects.

Although only preferred embodiments are specifically illustrated and described above, it will be appreciated that many modifications and variations of the present invention are possible in light of the above teachings and within the purview of the appended claims without departing from the spirit and intended scope of the invention.

| Case | Quaternary Ion | Phenol | Complex # Structure | m.p. °C. | Solvent Medium | Stoichiometry mole base/mole phenol | Reactant Addition Order | % Yield |
|---|---|---|---|---|---|---|---|---|
| 1. | Bu$_4$N | SDP | 1:1 | 199–204 | Dowanol-PM 1,3-dioxolane 1:1 by wt. | 1.1/1.0 | phenol to base | 46 |
| 2. | BzBu$_3$N | SDP | 2:1 | 169–170 | Dowanol dioxolane 1:1 | 1.0/1.0 | phenol to base | 66 |
| 3. | Bu$_4$N | SDP | 2:1 | 188–189 | Me Cellosolve | 1.0/1.0 | base to phenol | 60 |
| 4. | Bu$_4$N | SDP | 2:1 | 188–189 | Dowanol dioxolane ≈ 1:2 by vol. | 1.0/1.0 | base to phenol | 56 |
| 5. | Bu$_4$N | SDP | 1:1 | 204–205 | water, R.T. | 1.0/1.0 | quat. to phenol and base | 90 |
| 6. | Bu$_4$N | SDP | 2:1 | 189–190 | water, 95° | 1.0/1.0 | quat. to phenol and base | 74.6 |
| 7. | Bu$_4$N | SDP | 2:1 | 189–190 | base-water SDP-MIBK 85° C. | 1.0/1.0 | phenol to quat. | 75.8 |
| 8. | Bu$_4$N | SDP | 2:1 | 189 | base-water SDP-butanol | 1.0/1.0 | phenol to quat. | 72.8 |
| 9.a. | Bu$_4$N | SDP | bis-salt | sol. in H$_2$O | water R.T. → 10° V. | 1 eq.:1 eq. | quat. to SDP and base | — |
| 9.b. | Bu$_4$N | SDP | 2:1 | 188–189 | water, 40° C. | 1 eq. base to 3 eq. SDP | add'n. of SDP | 51.5 |
| 10. | Bu$_4$N | SDP | 1:1 Δ* | 204–205 | base-water SDP-butanol | 1.0/2.0 | base to phenol | 99.5* |
| 11. | Bu$_4$N | SDP∓ | 1:1 | 204.5–205.5 | base-water SDP-isophorone | 1.0/2.0 | base to phenol | 88.6 |
| 12. | Bu$_4$P | SDP | 1:1 | 192–193 | base-water SDP-water | 1.0/1.0 | base to phenol | 64.8 |
| 13. | Bu$_4$P | SDP | 1:1 | 192–193 | base-water SDP-butanol | 1.0/2.0 | base to phenol | 97.3 |
| 14. | BzMe$_3$N | SDP | — | H$_2$O insol. fluid | water | 1.0/1.0 | base to phenol | 64.5 |
| 15. | Me$_2$Bz(Alkyl)N | SDP | half salt Δ | H$_2$O insol. fluid - sol. in butanol | base-water SDP-butanol | 1.0/1.0 | phenol to base | 98.4 |
| 16. | Me$_3$BzN | SDP | 1:1 | soln. in butanol | base-water SDP-butanol | 1.0/2.0 | base to phenol | 100 |
| 17. | Me$_2$Bz(Alkyl)N | SDP | 1:1 | viscous fluid | base-water SDP-butanol | 1.0/2.0 | base to phenol | 100 |
| 18. | Me$_3$BzN | SDP | 1:1 | viscous fluid | base-water SDP-i-ProH | 1.0/2.0 | base to phenol | 99.4 |
| 19. | Bu$_4$N | Resorcinol | 1:1 most probable | viscous fluid | water | 1.0/2.0 | base to phenol | 93.3 |
| 20. | Bu$_4$N | p-t-Bu phenol | 1:2 | 117–118 | base-water phenol-i-PrOH | 1.0/2.0 | base to phenol | 92.3 |
| 21. | Bu$_4$N | p-t-Bu phenol | 1:2 | 116.5–118 | water | 1.0/2.0 | base to phenol | 94.7 |
| 22. | Bu$_4$N | 2,4,5-trichloro phenol | 1:1 | 83–84 | base-water phenol-i-PrOH | 1.0/2.0 | phenol to base | 41.2 |

-continued

| Case | Quaternary Ion | Phenol | Complex # Structure | m.p. °C. | Solvent Medium | Stoichiometry mole base/mole phenol | Reactant Addition Order | % Yield |
|---|---|---|---|---|---|---|---|---|
| 23. | Bu₄P | p-t-Bu phenol | 1:2 | 90–91 | base-water phenol-i-PrOH | 1.0/2.0 | base to phenol | 95.17 |
| 24. | Bu₄N | bis-phenol A | 1:1 | 212.5–213.5 | base-water phenol-acetone | 1:2 | base to phenol | 99.3 |

Legend:
Bu₄N - tetra n-butyl ammonium
Bu₄P - tetra n-butyl phosphonium
Me - methyl
Bz - benzyl
Alkyl - 50% $C_{14}$, 40% $C_{12}$, 10% $C_{16}$
SDP - 90:10 isomer mixture 4,4′ and 2,4′ sulfonyl diphenol
∓ pure 4,4′-sulfonyl diphenol
The complex structures for all solid compounds were determined via elemental analyses for C, H, N, P, S, Cl. Ratio is half salt to phenol. All compounds listed with melting points gave the correct elemental analyses.
*Determined to be soluble in water only to the extent of 0.10 g./Kg. $H_2O$ at 20° C.
△Demonstrated to be the desired salt catalyst by use in a polymerization reaction.
▫EDX analysis shows no sodium or bromine present in product: 6, 7, 8, 9, 10

What is claimed is:

1. A catalyst for the preparation of a phenoxy resin comprising a water-insoluble complex of a phenol and a quaternary ammonium or phosphonium salt of the phenol.

2. The catalyst of claim 1 wherein said phenol is an intermediate of said phenoxy resin.

3. The catalyst of claim 1 wherein said phenol is a dihydric phenol.

4. The catalyst of claim 3 wherein said dihydric phenol is sulfonyldiphenol.

5. The catalyst of claim 4 of the formula:

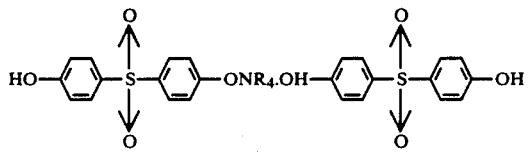

wherein R is a group which renders said complex insoluble.

6. The catalyst of claim 5 wherein R is a $C_1$–$C_{16}$ alkyl or aryl group.

7. A reaction medium for polymerization of phenoxy resins from the monomeric constituents thereof comprising:
   (i) a catalyst comprising a water-insoluble complex of a phenol and a quaternary ammonium or phosphonium salt of the phenol and;
   (ii) a solvent capable of dissolving the phenoxy resins and otherwise not interfering with the polymerization reaction.

8. The reaction medium of claim 7 wherein said solvent is free of ethylene glycol monomethyl ether.

9. The reaction of claim 7 wherein said solvent comprises propylene glycol monomethyl ether; 1,3-dioxolane; 1,4-dioxane tetrahydrofurfuryl alcohol; or mixtures thereof.

10. The reaction medium of claim 9 wherein said solvent is free of ethylene glycol monomethyl ether.

* * * * *